(12) United States Patent
Stojanovic

(10) Patent No.: US 7,562,931 B2
(45) Date of Patent: Jul. 21, 2009

(54) VEHICLE SEAT ASSEMBLY

(75) Inventor: Slavko Stojanovic, Plymouth, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 0 days.

(21) Appl. No.: 11/847,136

(22) Filed: Aug. 29, 2007

(65) Prior Publication Data

US 2009/0058154 A1 Mar. 5, 2009

(51) Int. Cl.
*B60N 2/36* (2006.01)
*B60N 3/00* (2006.01)
*A47C 7/62* (2006.01)

(52) U.S. Cl. .......................... 297/188.04; 297/188.01; 297/188.06; 297/188.07; 297/188.2; 297/378.1; 296/24.4; 296/24.43; 296/24.46; 296/37.16

(58) Field of Classification Search ............ 297/188.01, 297/188.04, 188.05, 188.06, 188.07, 378.1, 297/378.12, 378.13, 378.14, 331, 335, 336, 297/163; 296/24.4, 24.43
See application file for complete search history.

(56) References Cited

U.S. PATENT DOCUMENTS

| | | | | |
|---|---|---|---|---|
| 4,118,812 A | * | 10/1978 | Pangburn ........................ 5/657 |
| 4,538,737 A | * | 9/1985 | Delaney ................... 211/71.01 |
| 4,726,621 A | * | 2/1988 | Muller ................ 297/188.04 X |
| 4,938,401 A | * | 7/1990 | Weisbrodt et al. ............ 224/275 |
| 5,039,155 A | * | 8/1991 | Suman et al. ............. 296/65.03 |
| 5,054,837 A | * | 10/1991 | Chapman .................... 296/24.4 |
| 5,123,707 A | * | 6/1992 | Wurzell ....................... 297/464 |
| 5,129,612 A | * | 7/1992 | Beaupre ....................... 248/166 |
| 5,255,958 A | * | 10/1993 | Frischmann ................. 297/464 |
| 5,286,084 A | * | 2/1994 | Bart .................... 297/188.04 X |
| 5,464,102 A | * | 11/1995 | LeBlanc et al. ................ 211/12 |
| 5,484,091 A | * | 1/1996 | Malinowski et al. ......... 224/542 |
| 5,626,380 A | * | 5/1997 | Elson et al. .................. 296/39.1 |
| 5,788,324 A | * | 8/1998 | Shea et al. ........... 297/188.04 X |
| 5,971,487 A | * | 10/1999 | Passehl ............... 297/188.01 X |
| 5,979,725 A | * | 11/1999 | Lehrman ..................... 224/539 |
| 5,984,347 A | * | 11/1999 | Blanc-Rosset ...... 297/188.06 X |
| 6,059,358 A | * | 5/2000 | Demick et al. .......... 297/188.04 |
| 6,142,574 A | * | 11/2000 | Alexander ........... 297/188.2 X |
| 6,155,639 A | * | 12/2000 | Frolo .......................... 297/331 |
| 6,220,660 B1 | * | 4/2001 | Bedro et al. ........... 297/188.04 |
| 6,247,741 B1 | * | 6/2001 | Seel et al. ................. 296/37.14 |
| 6,250,700 B1 | * | 6/2001 | Traxler ..................... 296/24.46 |

(Continued)

FOREIGN PATENT DOCUMENTS

JP 2004-090862 3/2004

*Primary Examiner*—Rodney B White
(74) *Attorney, Agent, or Firm*—Global IP Counselors, LLP

(57) ABSTRACT

A vehicle seat assembly includes a first seat section, a second seat section, and a portioning panel. The first seat section has a first cushion portion and a first seatback portion that define a first seating area. The second seat section has a second cushion portion and a second seatback portion that define a second seating area disposed laterally adjacent the first seating area. The second seatback portion is movably mounted between an upwardly extending in-use orientation and a retracted non-use orientation. The partitioning panel is movably arranged between a stowed position in which the partitioning panel is disposed outside of the first and second seating areas and a partitioning position in which the partitioning panel extends upwardly along a lateral side of the first seat section in a forward to aft direction of the first seat section.

18 Claims, 18 Drawing Sheets

U.S. PATENT DOCUMENTS

| | | | |
|---|---|---|---|
| 6,253,943 B1 * | 7/2001 | Spykerman et al. | 220/6 |
| 6,260,903 B1 * | 7/2001 | von der Heyde | 296/24.46 |
| 6,290,277 B1 * | 9/2001 | Spykerman et al. | 296/24.43 |
| 6,488,327 B1 * | 12/2002 | Pearse et al. | 297/188.1 X |
| 6,502,886 B1 * | 1/2003 | Bleau et al. | 296/37.3 |
| 6,609,744 B2 * | 8/2003 | Gehring et al. | 296/37.5 |
| 6,644,709 B2 * | 11/2003 | Inagaki et al. | 296/37.16 |
| 6,669,259 B2 * | 12/2003 | Murray et al. | 296/24.46 |
| 6,676,185 B2 * | 1/2004 | Gehring et al. | 296/37.5 |
| 6,702,375 B1 * | 3/2004 | Laskowski et al. | 297/188.07 |
| 6,719,347 B2 * | 4/2004 | Gehring et al. | 296/37.5 |
| 6,811,198 B2 * | 11/2004 | Caro et al. | 296/37.8 |
| 6,851,735 B2 * | 2/2005 | Hicks et al. | 296/37.1 |
| 6,874,667 B2 * | 4/2005 | Dykstra et al. | 224/498 |
| 6,962,382 B2 * | 11/2005 | Scarlett | 296/24.46 |
| 6,978,736 B2 * | 12/2005 | Sanford et al. | 119/496 |
| 6,981,730 B2 * | 1/2006 | Bixby | 297/188.1 X |
| 6,983,969 B2 * | 1/2006 | Murray et al. | 296/24.4 |
| 7,114,772 B2 * | 10/2006 | Kobayashi et al. | 297/188.04 |
| 7,195,297 B2 * | 3/2007 | Murray et al. | 296/24.4 |
| 7,201,421 B2 * | 4/2007 | Reynolds et al. | 296/37.5 |
| 7,300,105 B2 * | 11/2007 | Jasinski et al. | 297/188.04 |
| 7,523,985 B2 * | 4/2009 | Bhatia et al. | 297/188.04 |
| 2007/0013201 A1 | 1/2007 | Wagner et al. | |

* cited by examiner

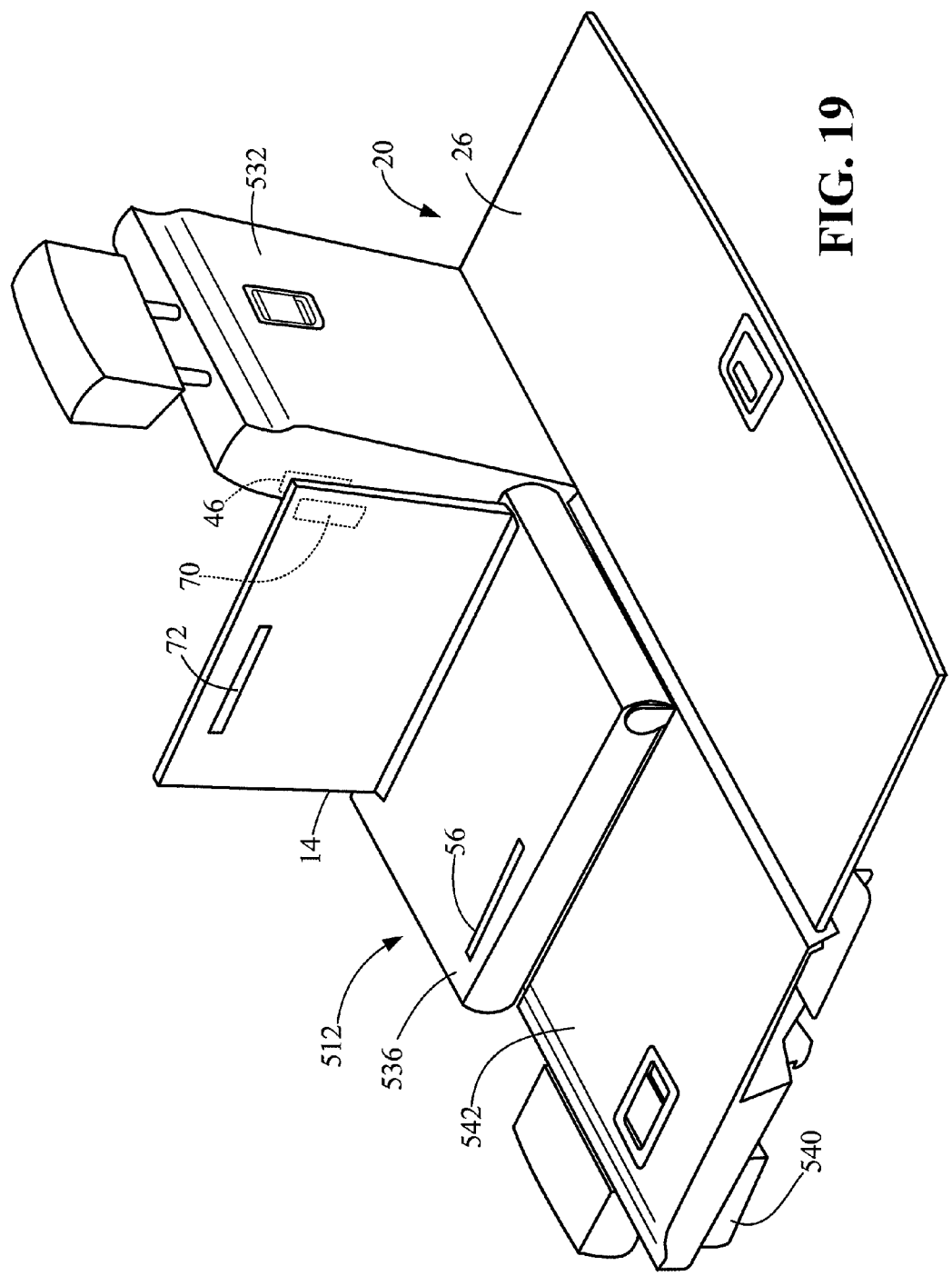

VEHICLE SEAT ASSEMBLY

BACKGROUND OF THE INVENTION

1. Field of the Invention

The present invention relates to a vehicle seat assembly. More specifically, the present invention relates to vehicle seat assembly that includes at least two adjacent seating areas with a pair of adjacent seatback portions, where one seatback portion folds down to provide cargo storage space adjacent to the other of the seating areas.

2. Background Information

In recent years, many vehicles have been provided with passenger seat assemblies adjacent to or in front of storage areas within the vehicle. The seat assembly typically includes at least two seating areas or spaces each having a separate fold-down seatback portion. Typically, one of the two seatback portions can be folded down providing a generally horizontal surface while the other seatback portion remains in an upright orientation. Cargo can be placed on the surface of the folded down seatback portion, while a passenger is still able to sit in the other seating area. This arrangement allows for increased cargo space within the vehicle without sacrificing an entire row of seating spaces.

There is a problem with such a seating arrangement in that cargo placed on the folded down seatback portion may move toward the adjacent seating space, in particular when the vehicle is cornering.

In view of the above, it will be apparent to those skilled in the art from this disclosure that there exists a need for an improved seat assembly that prevents cargo placed on a folded down seatback portion from moving toward a passenger seated adjacent to the cargo. This invention addresses this need in the art as well as other needs, which will become apparent to those skilled in the art from this disclosure.

SUMMARY OF THE INVENTION

One object of the present invention is to provide a partition between a seating area and a laterally adjacent storage area.

In accordance with one aspect of the present invention, a vehicle seat assembly includes a first seat section, a second seat section and a partitioning panel. The first seat section has a first cushion portion and a first seatback portion that define a first seating area. The second seat section has a second cushion portion and a second seatback portion that define a second seating area disposed laterally adjacent the first seating area. The second seatback portion is movably mounted between an upwardly extending in-use orientation and a retracted non-use orientation. The partitioning panel is movably arranged between a stowed position in which the partitioning panel is disposed outside of the first and second seating areas and a partitioning position in which the partitioning panel extends upwardly along a lateral side of the first seat section in a forward to aft direction of the first seat section.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 19 is a perspective view of the third row seat assembly with the first seatback portion in an upwardly extending in-use orientation, the second seatback portion in the retracted non-use orientation and the partitioning panel in the partitioning position in accordance with the sixth embodiment of the present invention.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
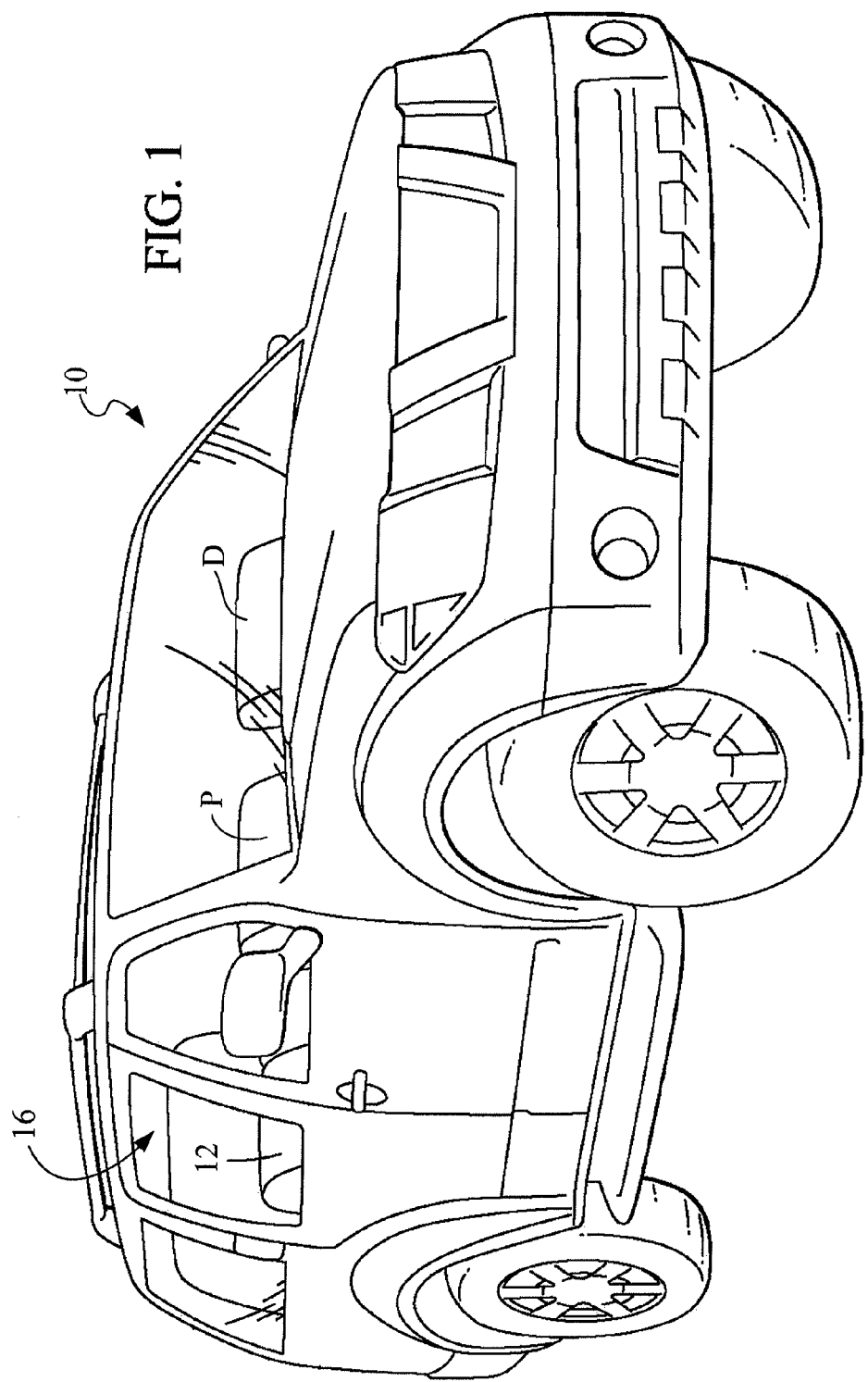
FIG. 1 is a perspective view of a vehicle showing a seat assembly in accordance with the present invention.
Figure 2:
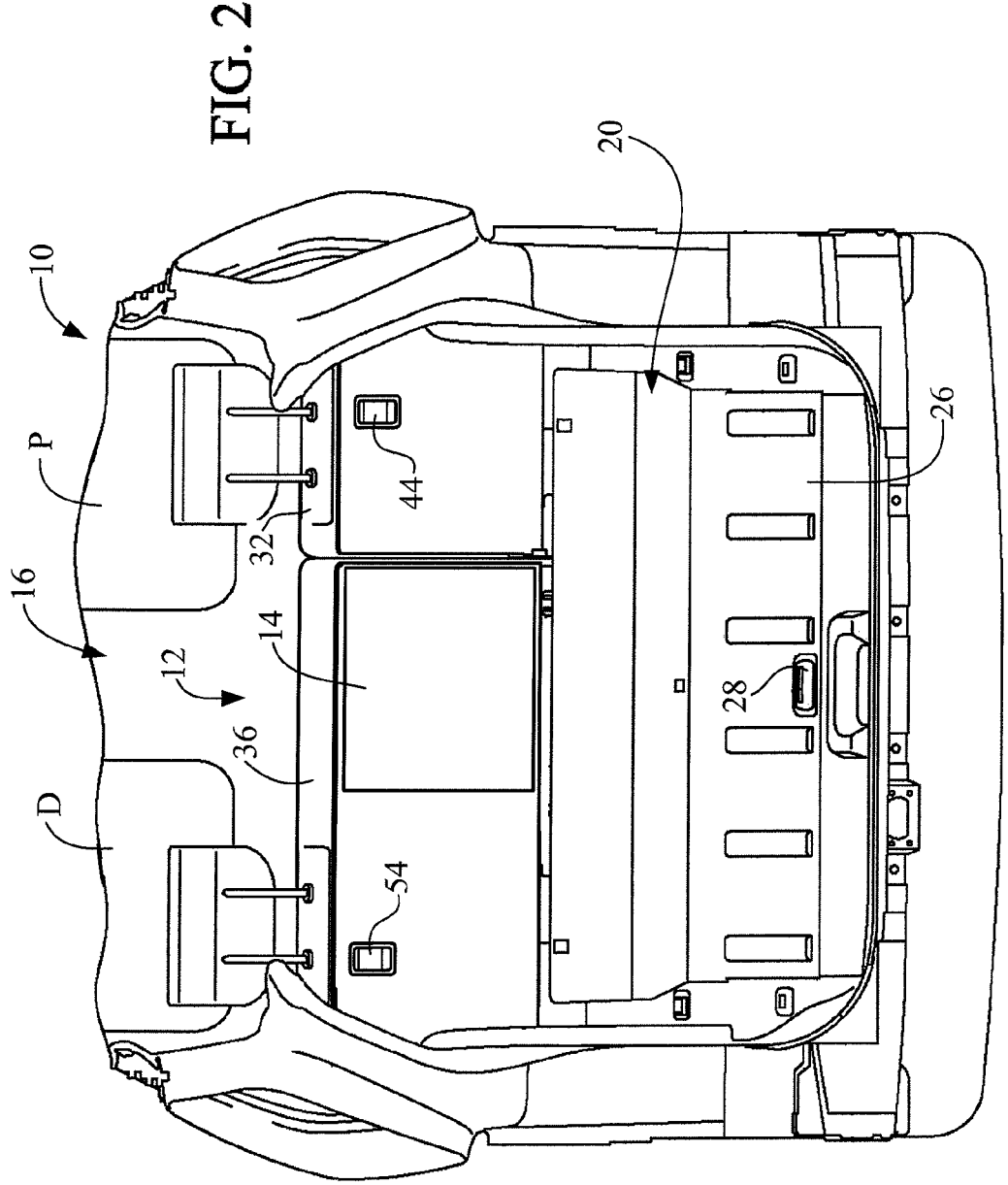
FIG. 2 is a rear view of the vehicle, viewed from a downward angle with a rear door of the vehicle removed showing a cargo area and the seat assembly in accordance with a first embodiment of the present invention.

Referring initially to FIG. 1, a vehicle 10 that includes a seat assembly 12 is illustrated in accordance with a first embodiment of the present invention. As shown in FIG. 2, the seat assembly 12 includes a movable partitioning panel 14 that is movable between a stowed position shown in FIG. 2 and a partitioning position shown in FIG. 5, as described in greater detail below.

Figure 3:
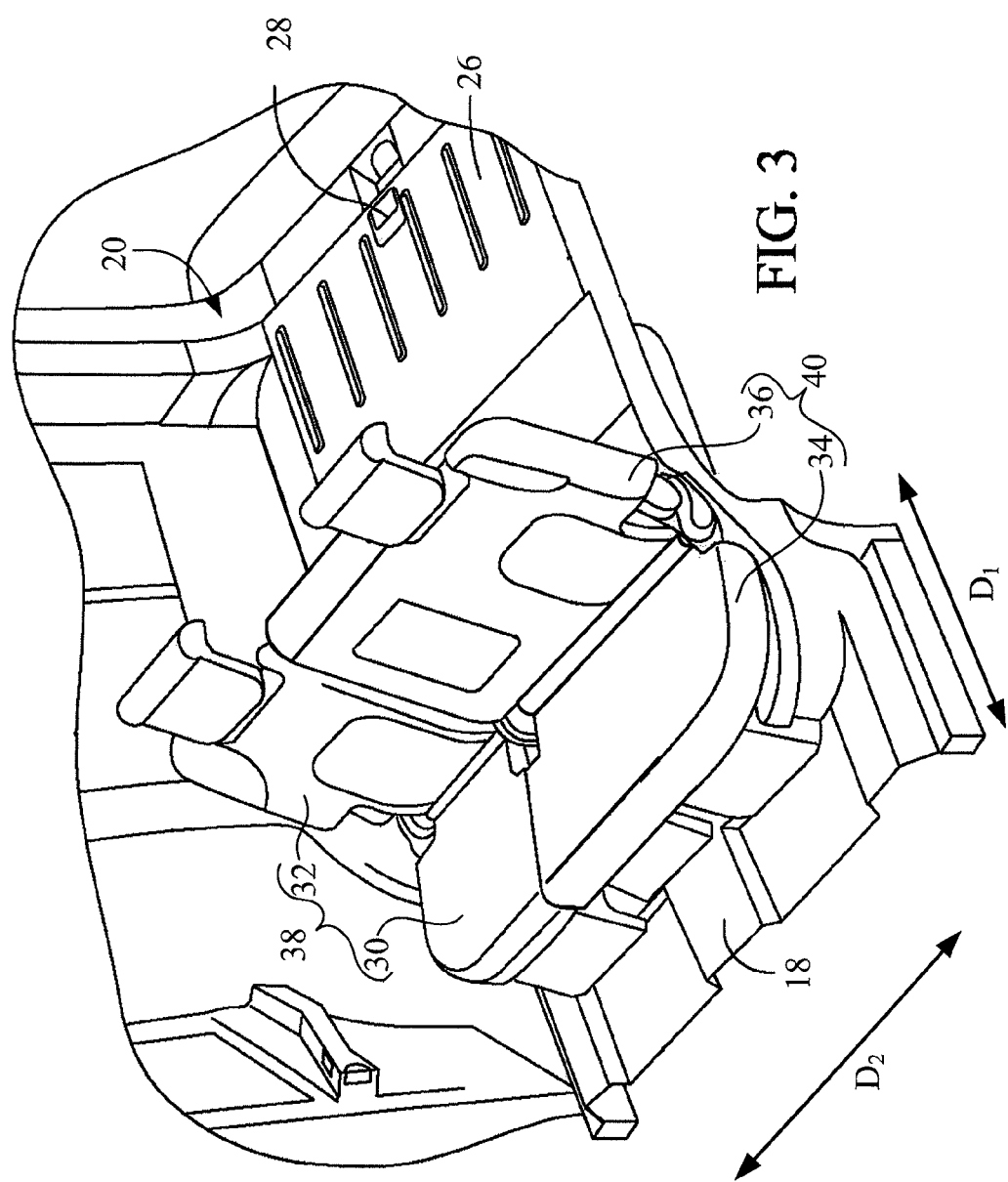
FIG. 3 is a perspective side view of the vehicle, with one side of the vehicle removed, showing the seat assembly and the cargo area, with first and second seatback portions of the seat assembly in an upwardly extending in-use orientation in accordance with the first embodiment of the present invention.
Figure 4:
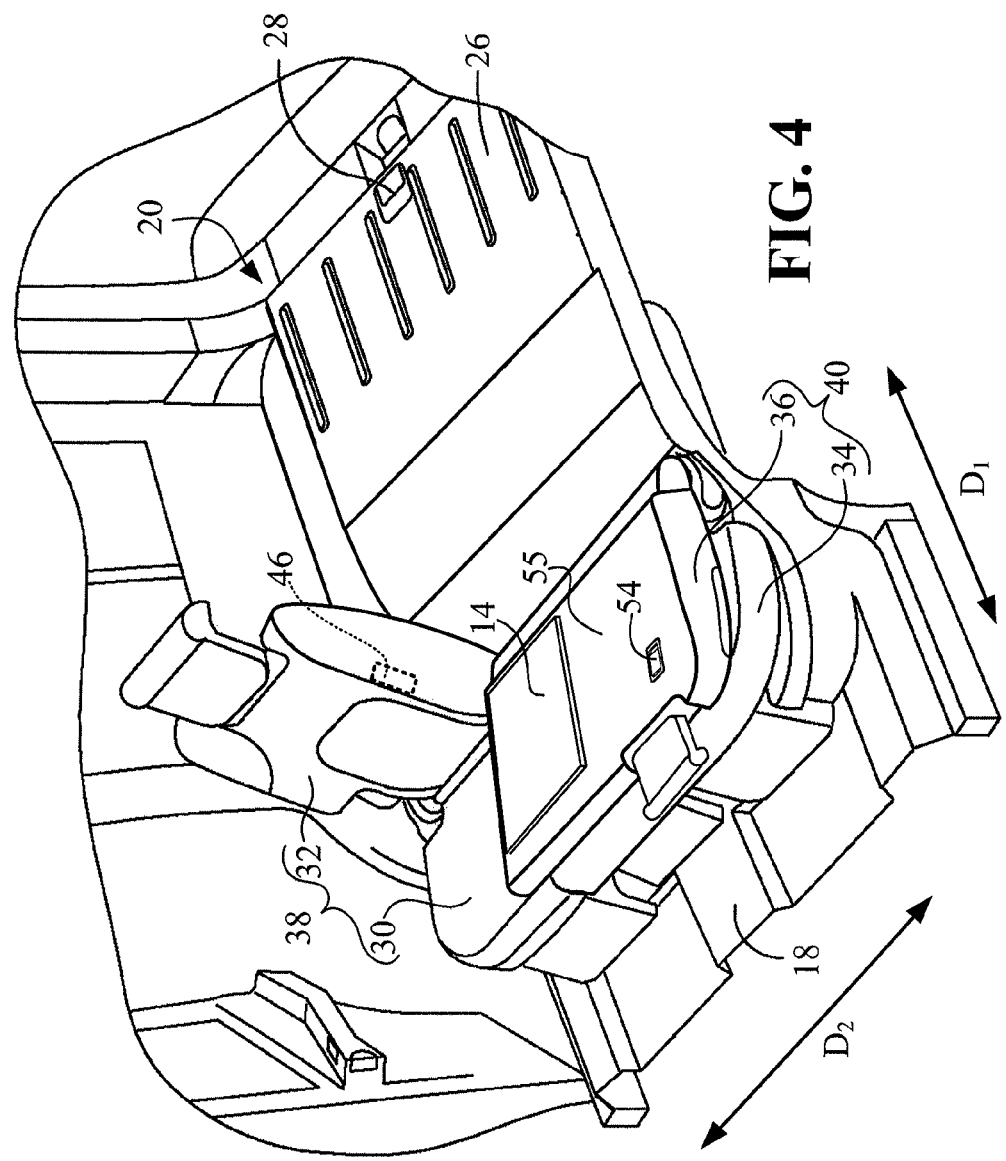
FIG. 4 is a perspective side view of the vehicle similar to FIG. 3, showing the second seatback portion of the seat assembly in a retracted non-use orientation and a partitioning panel in a stowed position in accordance with the first embodiment of the present invention.
Figure 5:
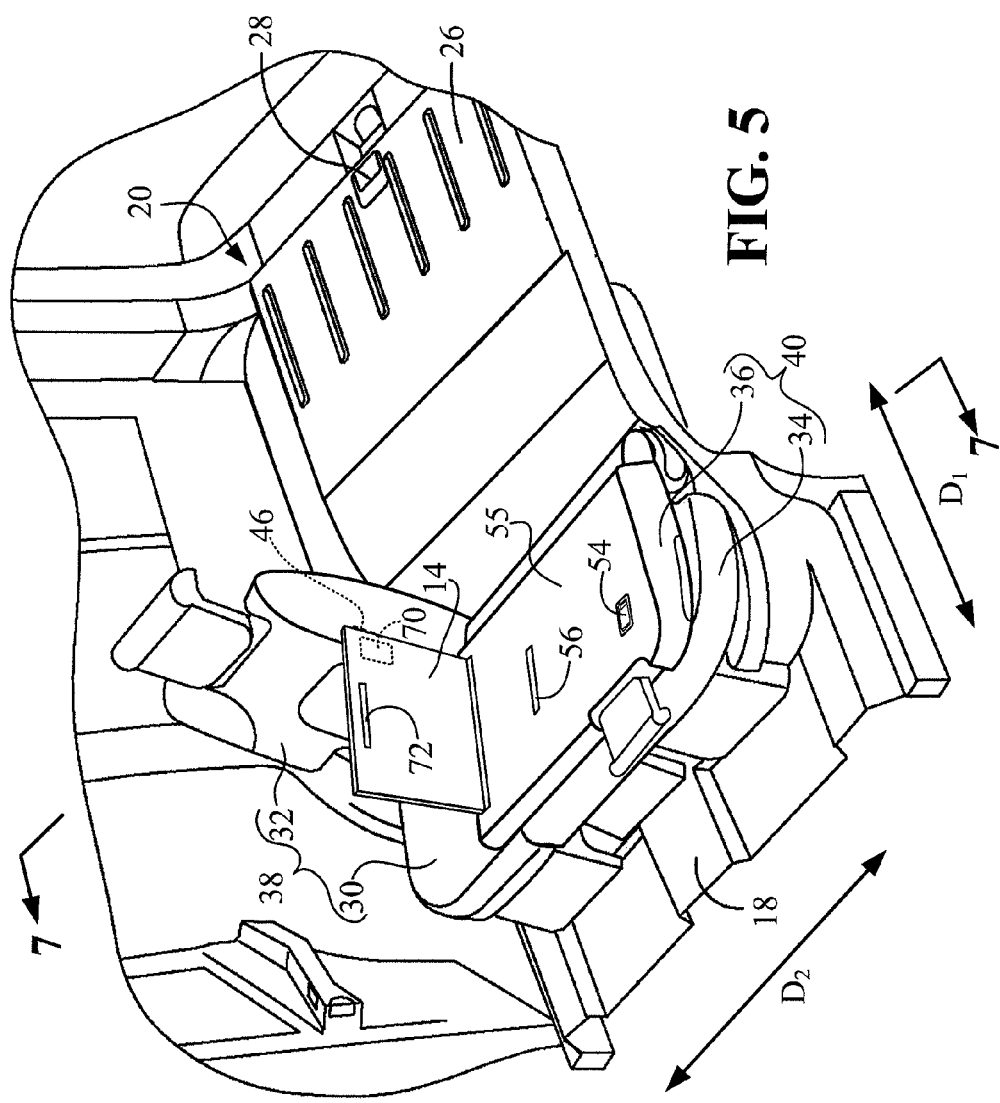
FIG. 5 is a perspective side view of the vehicle similar to FIGS. 3 and 4, showing the second seatback portion of the seat assembly in the retracted non-use orientation and the partitioning panel in a partitioning position in accordance with the first embodiment of the present invention.

As best shown in FIG. 2, the vehicle 10 includes a passenger compartment 16, a floor 18, a cargo area 20 and the seat assembly 12, which is mounted to the floor 18 (see FIGS. 3-5). In FIG. 2, a rear door has been removed to show details of the cargo area 20 and a backside of the seat assembly 12 including the partitioning panel 14.

In the first embodiment depicted in FIGS. 1-7, the seat assembly 12 is depicted as a second row of seats immediately behind a front row driver's seat D (FIGS. 1 and 2) and adjacent passenger seat P (FIGS. 1 and 2). As shown in FIG. 2, the cargo area 20 is located behind the seat assembly 12. The cargo area 20 of the first embodiment is dimensioned such that a third row of seats can optionally be installed within the cargo area 20 behind the seat assembly 12. For the purposes of describing the present invention, such a third row of seats is omitted from the vehicle 10 in the first embodiment. However, it should be understood from the drawings and the description herein that the present invention can be incorporated into the seat assembly 12 where the seat assembly 12 is a second row of seats and/or a third row of seats installed within the passenger compartment 16 of the vehicle 10. More specifically, a third row of seats (not shown) can be installed behind the seat assembly 12, where the seat assembly 12 includes the partitioning panel 14 of the present invention.

The cargo area 20 includes a cargo deck 26. The cargo deck 26 can be a removable panel locked into position by a latching mechanism 28. A storage compartment (not shown) is preferably concealed under the cargo deck 26.

With specific reference to FIGS. 3, 4 and 5, a description of the seat assembly 12 is now provided. As indicated in FIG. 3, the vehicle 10 defines a longitudinal direction $D_1$ and a lateral vehicle direction $D_2$. The seat assembly 12 extends in the lateral vehicle direction $D_2$ and is supported by the floor 18 in a conventional manner. In the first embodiment of the present invention, the seat assembly 12 basically includes a first cushion portion 30, a first seatback portion 32, a second cushion portion 34 and a second seatback portion 36. The first cushion portion 30 and the first seatback portion 32 together define a first seat section 38 of the seat assembly 12, which includes a first seating area. In the depicted embodiment, the first seating section 38 is dimensioned to seat a single passenger. The second cushion portion 34 and the second seatback portion 36 together define a second seat section 40, which includes a second seating area. In the depicted embodiment, the second seating section 40 is dimensioned to seat two passengers. Thus, three passengers can be easily seated in the seat assembly 12. The second seating section 40 (and the second seating area) is located adjacent to the first seating section 38 (and the first seating area). The second seat section 40 is wider in lateral vehicle direction $D_2$ than the first seat section 38.

In the depicted first embodiment in FIGS. 3-5, the first cushion portion 30 is non-pivotally fixed to the vehicle floor 18. However, in alternative embodiments described below, the first cushion portion 30 is shown as being movable relative to the vehicle floor 18.

The first seatback portion 32 is preferably pivotable between an upwardly extending in-use orientation (shown in FIGS. 3-5) and a retracted non-use orientation (not shown). A conventional position locking mechanism (not shown) within the first seatback portion 32 is operated by a lever mechanism 44, shown in FIG. 2. Operation of the lever mechanism 44 allows movement of the first seatback portion 32 between the upwardly extending in-use orientation (shown in FIGS. 3-5) and the retracted non-use orientation.

The first seatback portion 32 also includes a fastening element 46. The fastening element 46 is configured to selectively retain the partitioning panel 14 (the partition) in the partitioning position shown in FIG. 5, as described further below.

Figure 6:
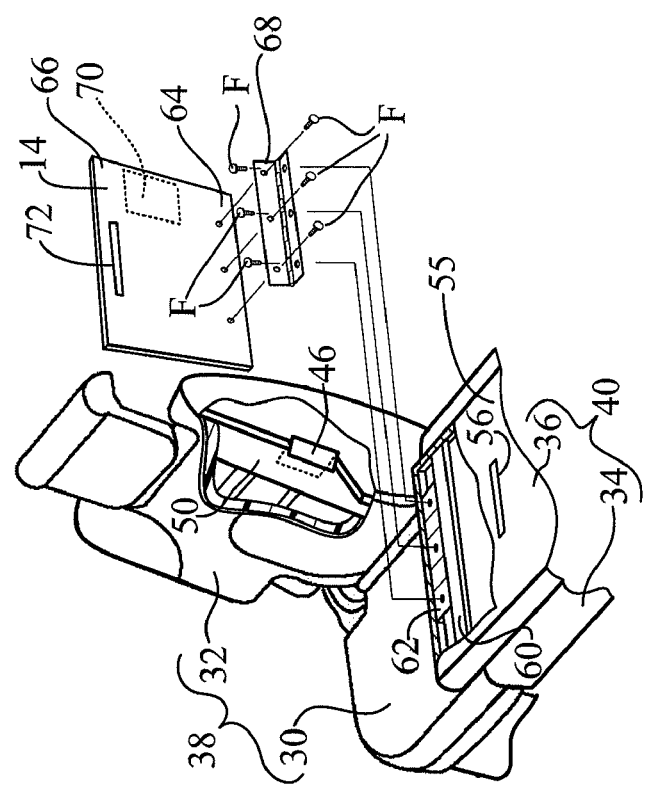
FIG. 6 is an exploded perspective side view of the seat assembly showing details of the first seatback portion, second seatback portions and the partitioning panel in accordance with the first embodiment of the present invention.

As best shown in FIG. 6, the first seatback portion 32 includes a conventional rigid support structure 50. In the depicted embodiment, the fastening element 46 is an angled bracket that is welded, bolted or otherwise rigidly attached to the rigid support structure 50 of the first seatback portion 32. However, the fastening element 46 can include a variety of alternative structures and/or mechanisms for retaining the partitioning panel 14 in position. A further description of the fastening element 46 is provided below along with a more detailed description of the partitioning panel 14.

In the depicted first embodiment in FIGS. 3-5, the second cushion portion 34 is non-pivotally fixed to the vehicle floor 18. However, in alternative embodiments described below, the second cushion portion 34 is shown as being movable relative to the vehicle floor 18.

As shown in FIGS. 3-5, the second seatback portion 36 is movably mounted between an upwardly extending in-use orientation (FIG. 3) and a retracted non-use orientation (FIGS. 4 and 5). The second seatback portion 36 includes a conventional position locking mechanism (not shown) operated by a lever mechanism 54, shown in FIGS. 2, 4 and 5. Operation of the lever mechanism 54 allows movement of the second seatback portion 36 between the upwardly extending in-use orientation (shown in FIG. 3) and the retracted non-use orientation (shown in FIGS. 4 and 5).

As best shown in FIG. 5, the second seatback portion 36 also includes a rear surface 55 with a partition retaining portion 56 mounted thereon. The partition retaining portion 56 is configured to selectively retain the partitioning panel 14 (the partition) in the stowed position shown in FIGS. 2 and 4, as described further below.

Figure 7:
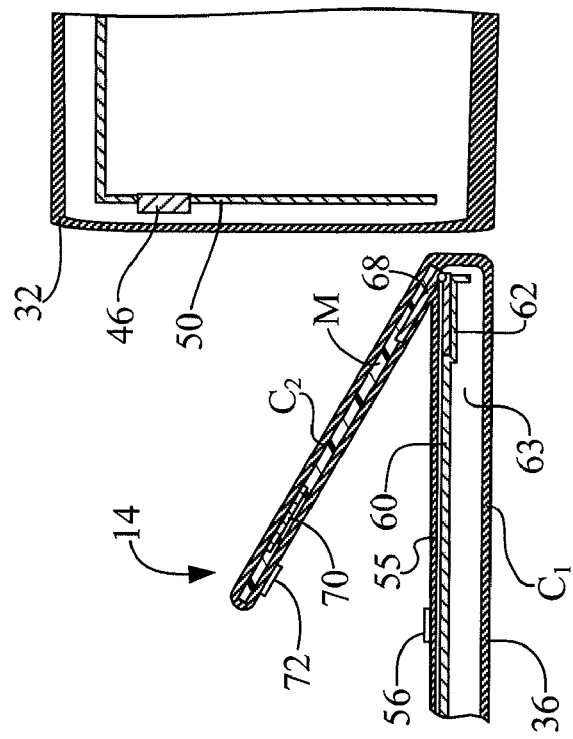
FIG. 7 is a cross-sectional view taken along the lines 7-7 in FIG. 5 of the seat assembly showing details of the first and second seatback portions and the partitioning panel in accordance with the first embodiment of the present invention.

As best shown in FIG. 6, the second seatback portion 36 includes a conventional rigid support structure 60 and a hinge support portion 62 that is welded, bolted or otherwise rigidly attached to the rigid support structure 60 of the second seatback portion 36. As best shown in FIG. 7, the second seatback portion 36 includes a cushion material 63 on one side of the rigid support structure 60. Both the rigid support structure 60 and the cushion material 63 are covered with an outer covering $C_1$. The outer covering $C_1$ can be made of any of a variety of materials, such as leather, leather-like materials, vinyl, textile or similar conventional seat covering materials. A further description of the partition retaining portion 56 and the hinge support portion 62 is provided below with a more detailed description of the partitioning panel 14.

With specific reference to FIGS. 4, 5 and 6, a description of the partitioning panel 14 is now provided. The partitioning panel 14 is configured to move between the stowed position depicted in FIG. 4 and the partitioning position depicted in FIG. 5. In the stowed position (FIG. 4), the partitioning panel 14 is disposed outside of the first and second seating sections 38 and 40 (and outside the first and second seating areas). In the partitioning position (FIG. 5), the partitioning panel 14 extends upwardly along a lateral side of the first seat section 38 in a forward to aft direction of the first seat section 38. It should be understood from the drawings and the description herein, that the lateral side is defined relative to the lateral vehicle direction $D_2$, and the forward to aft direction of the first seat section 38 corresponds to the longitudinal direction $D_1$ of the vehicle 10.

As best shown in FIGS. 6 and 7, the partitioning panel 14 is preferably a rigid member that is generally flat and planar. The partitioning panel 14 preferably includes a sheet of core material M (shown in FIG. 7) such as plywood, a composite material, vinyl, polymer or plastic material that is covered with a seat covering $C_2$ made of a material that is similar to or the same as the outer covering $C_1$ of the second seatback portion 36.

It should be understood from the drawings and the description herein that the partitioning panel 14 can have any of a variety of shapes and contours. For example, the sheet of core material M and the partitioning panel 14 can alternatively be provided with a non-planar shape. More specifically, the partitioning panel 14 can be molded to provide additional passenger comforts, such as an accessory hook (not shown), an arm rest (not shown) and/or a cup holder (not shown) that are available with the partitioning panel 14 in the partitioning position. Alternatively, the partitioning panel 14 can be provided with a cargo hook (not shown) that is usable with the partitioning panel 14 in the stowed position.

With reference again to both FIGS. 6 and 7, the partitioning panel 14 includes a lower section 64, an upper section 66, a hinge 68, a positioning fastening element 70 and a stowing fastening element 72. The hinge 68 can be an elongated mechanical hinge, as shown in FIG. 6. Fasteners F are used to fasten the hinge 68 to the lower section 64 of the core material M of the partitioning panel 14 and to the rear surface 55 and the hinge support portion 62 of the second seatback portion 36. Hence, the partitioning panel 14 is easily pivoted about the hinge 68 between the stowed position shown in FIG. 2 and the partitioning position shown in FIG. 5. Preferably, the hinge 68 is covered by the covering $C_2$ that is sewn or otherwise mated to the outer covering $C_1$ of the second seatback portion 36.

It should be understood from the drawings and the description herein that the outer covering $C_1$ of the second seatback portion 36 and the covering $C_2$ can be made of a fabric such as a textile material, vinyl, leather or leather-like material. Preferably, the outer covering $C_1$ of the second seatback portion 36 and the covering $C_2$ are formed integrally or are sewn together such that the partitioning panel 14 blends in with the overall appearance of the second seatback portion 36. Further, although the hinge 68 can be visible, the hinge 68 is preferably at least partially concealed or completely concealed by the outer covering $C_1$ of the second seatback portion 36 and/or the covering $C_2$.

In an alternative embodiment, the hinge 68 can be a living hinge made entirely of fabric, plastic and/or vinyl that is sewn or otherwise integrated with the construction and/or covering of the second seatback portion 36.

The positioning fastening element 70 is preferably fixed to the core material M of the partitioning panel 14. Alternatively, the core material M can be molded around the positioning fastening element 70 such that the positioning fastening element 70 is embedded within the core material M of the partitioning panel 14.

The fastening element 46 of the first seatback portion 32 and the positioning fastening element 70 of the partitioning panel 14 are configured and arranged to cooperate together to selectively retain the partition in the partitioning position. Preferably one of the fastening element 46 and the positioning fastening element 70 includes a magnet and the other of the fastening element 46 and the positioning fastening element 70 includes a magnetically susceptible material. Thus, when the fastening element 46 and the positioning fastening element 70 are brought in proximity with one another, magnetic forces pull them toward one another and hold the partitioning panel 14 in the partitioning position shown in FIG. 5. Hence, the partitioning panel 14 is held in the partitioning position by interaction between the fastening element 46 of the first seatback portion 32 and the positioning fastening element 70 of the partitioning panel 14.

In an alternative embodiment, the fastening element 46 of the first seatback portion 32 and the positioning fastening element 70 of the partitioning panel 14 can alternatively be replaced by loop and hook fastening materials. Further, the fastening element 46 and the position fastening element 70 can be replaced with mated buttons and button holes, mating snapping elements, a turn-able key and slot arrangement and/or a mechanical latching mechanism or mechanisms. In other words, the fastening element 46 and the position fastening element 70 can be replaced with any of a variety of alternative fastening and/or latching arrangements.

The stowing fastening element 72 of the partitioning panel 14 is fixed to one side thereof so that the stowing fastening element 72 faces the rear surface 55 of the second seatback portion 36 with the partitioning panel in the stowed positioned. Further the stowing fastening element 72 aligns with the partition retaining portion 56 of the second seatback portion 36. The partition retaining portion 56 (a fastening element) and the stowing fastening element 72 are configured and arranged to cooperate together to selectively retain the partitioning panel 14 in the stowed position. The partition retaining portion 56 and the stowing fastening element 72 preferably comprise hook and loop fastening materials. More specifically, one of the partition retaining portion 56 and the stowing fastening element 72 is a hook fastener material and the other is a loop fastening material. Such hook and loop fastening materials are conventional materials typically made of a woven textile and/or plastic material where the hooks of the hook fastening material engages and releasably fastens to the loop fastening material acting as a fastener. Sufficient force releases the engagement between the hook and loop fastening materials. The partition retaining portion 56 and the stowing fastening element 72 serve to retain the partitioning panel 14 against the rear surface 55 (a backside) of the second seatback portion 36 in the stowed position, as shown in FIG. 4.

In FIGS. 4 and 5, the rear surface of the second seatback portion 36 is depicted as a generally smooth, flat surface. However, it should be understood from the drawings and the description of the present invention that the rear surface 55 of the second seatback portion 36 can be shaped or contoured to receive and partially conceal the partitioning panel 14. More specifically, the rear surface 55 of the second seatback portion 36 can alternatively include a recess (not shown) that is dimensioned to receive the partitioning panel 14. With such a recess (not shown) with the partitioning panel 14 in the stowed position, the rear surface 55 and the partitioning panel 14 form a generally planar surface at least partially obscuring the partitioning panel 14.

Second Embodiment

Figure 8:
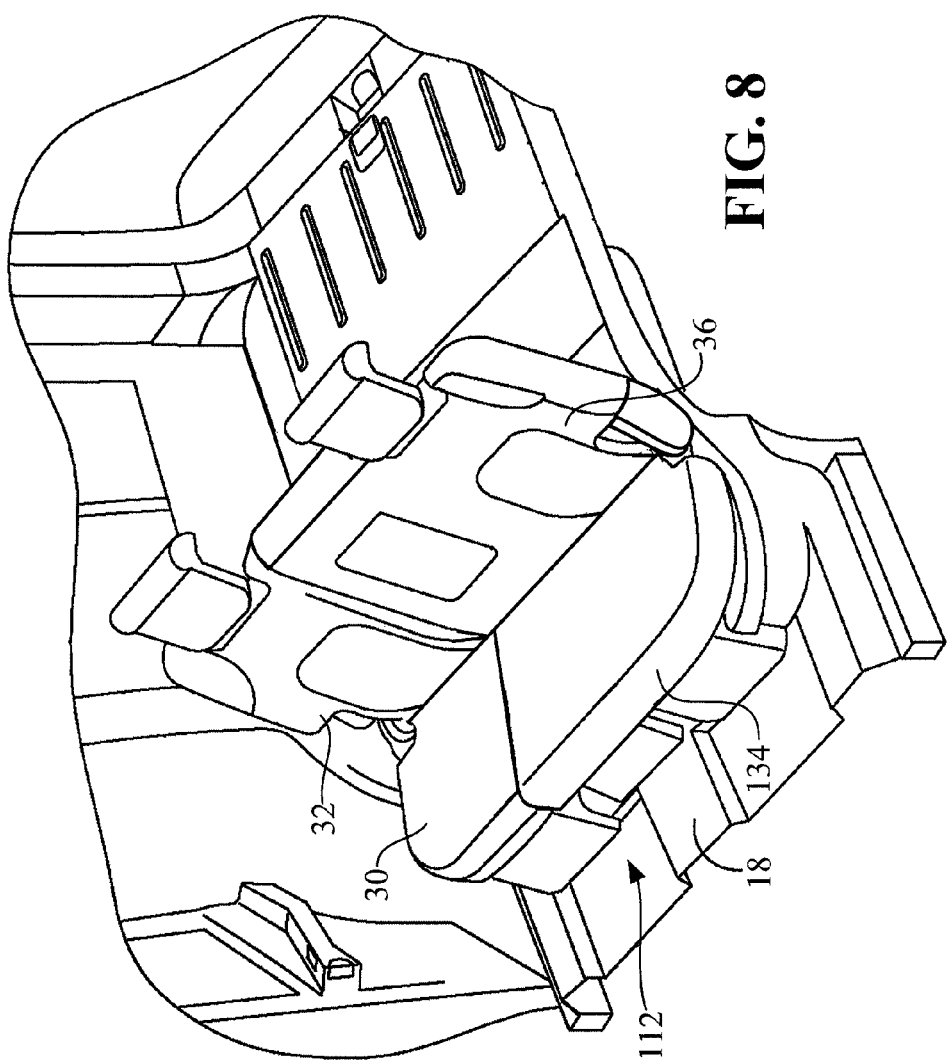
FIG. 8 is a perspective side view of the vehicle with one side of the vehicle removed, showing a seat assembly and a cargo area, with first and second cushion portions in a generally horizontal seating orientation and first and second seatback portions of the seat assembly in an upwardly extending in-use orientation in accordance with a second embodiment of the present invention.
Figure 9:
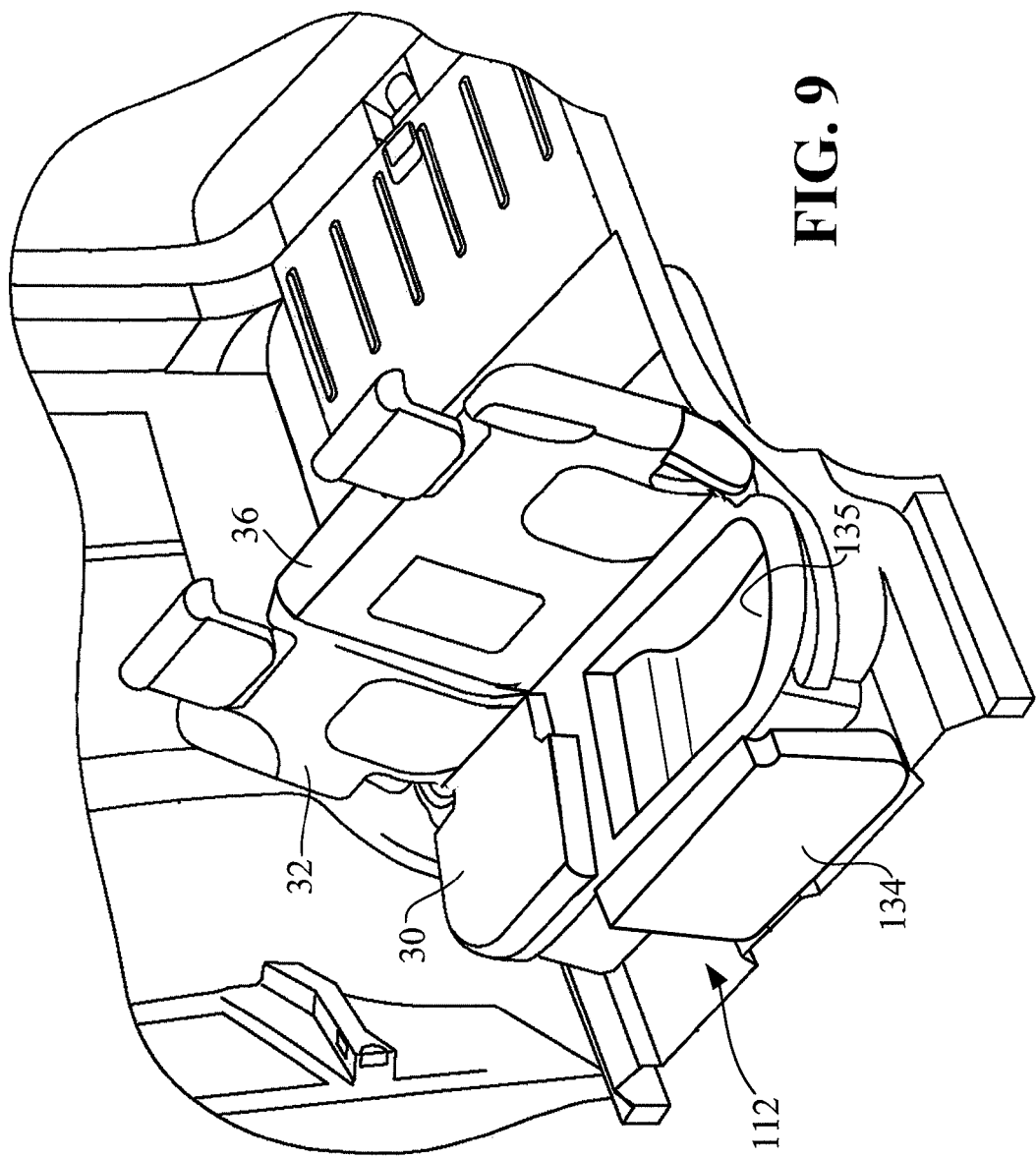
FIG. 9 a perspective side view of the vehicle similar to FIG. 8, showing the second cushion portion of the seat assembly in a retracted non-use vertical orientation in accordance with the second embodiment of the present invention.
Figure 10:
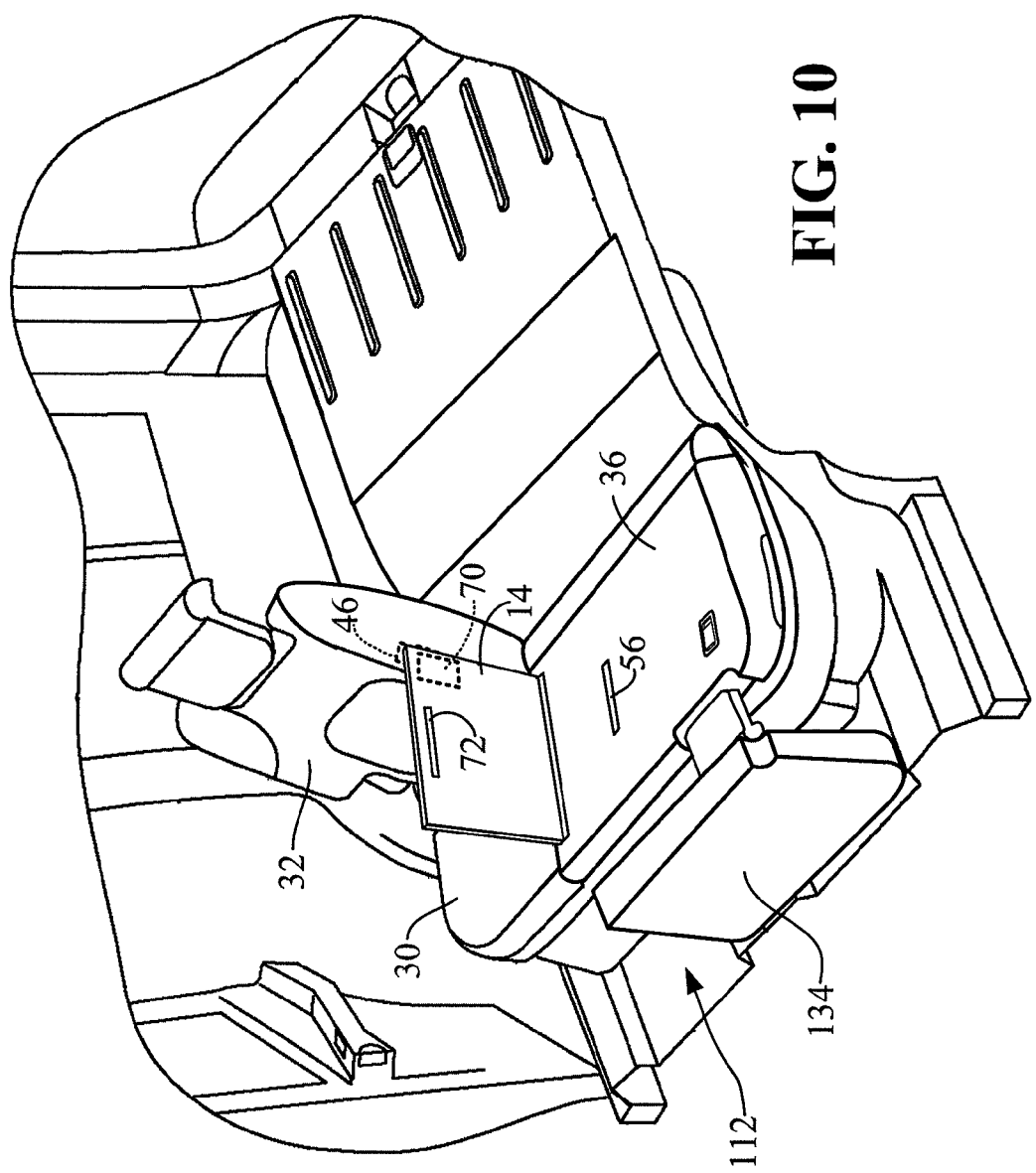
FIG. 10 is a perspective side view of the vehicle similar to FIGS. 8 and 9, showing the second seatback portion of the seat assembly in the retracted non-use orientation and the partitioning panel in a partitioning position in accordance with the second embodiment of the present invention.

Referring now to FIGS. 8, 9 and 10, a seat assembly 112 with a partitioning panel 14 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment the seat assembly 112 has many elements that are identical to the seat assembly 12 of the first embodiment. Specifically, in the seat assembly 112, the first cushion portion 30, the first seatback portion 32, the second seatback portion 36 and the partitioning panel 14 are the same as in the first embodiment. As shown in FIG. 10, the first seatback portion 32 includes the fastening element 46 and the second seatback portion 36 includes the partition retaining portion 56. The partitioning panel 14 is as described with respect to the first embodiment above. However, in the second embodiment with the seat assembly 112, the second cushion portion 34 is replaced with a second cushion portion 134 that is pivotal relative to the vehicle floor 18 between a generally horizontal seating orientation shown in FIG. 8 and a retracted non-use vertical orientation as shown in FIGS. 9 and 10. With the second cushion portion 134 in the generally horizontal seating orientation the second cushion portion 134 interferes with movement of the second seatback portion 36 to its retracted orientation. Only with the second cushion portion 134 in the retracted non-use vertical orientation is the second seatback portion 36 is freely movable to the retracted orientation as shown in FIG. 9.

Further, with the second cushion portion 134 in the retracted non-use vertical orientation, a storage compartment 135 is revealed, as shown in FIG. 9.

Although the first cushion portion 30 is depicted in the second embodiment as being non-movably fixed to the vehicle floor 18, the first cushion portion 30 can also be modified or replaced such that the first cushion portion can pivot between a generally horizontal seating orientation and a retracted non-use vertical orientation in a manner similar to the second cushion portion 134. Operation of the partitioning panel 14 is the same as in the first embodiment.

Third Embodiment

Figure 11:
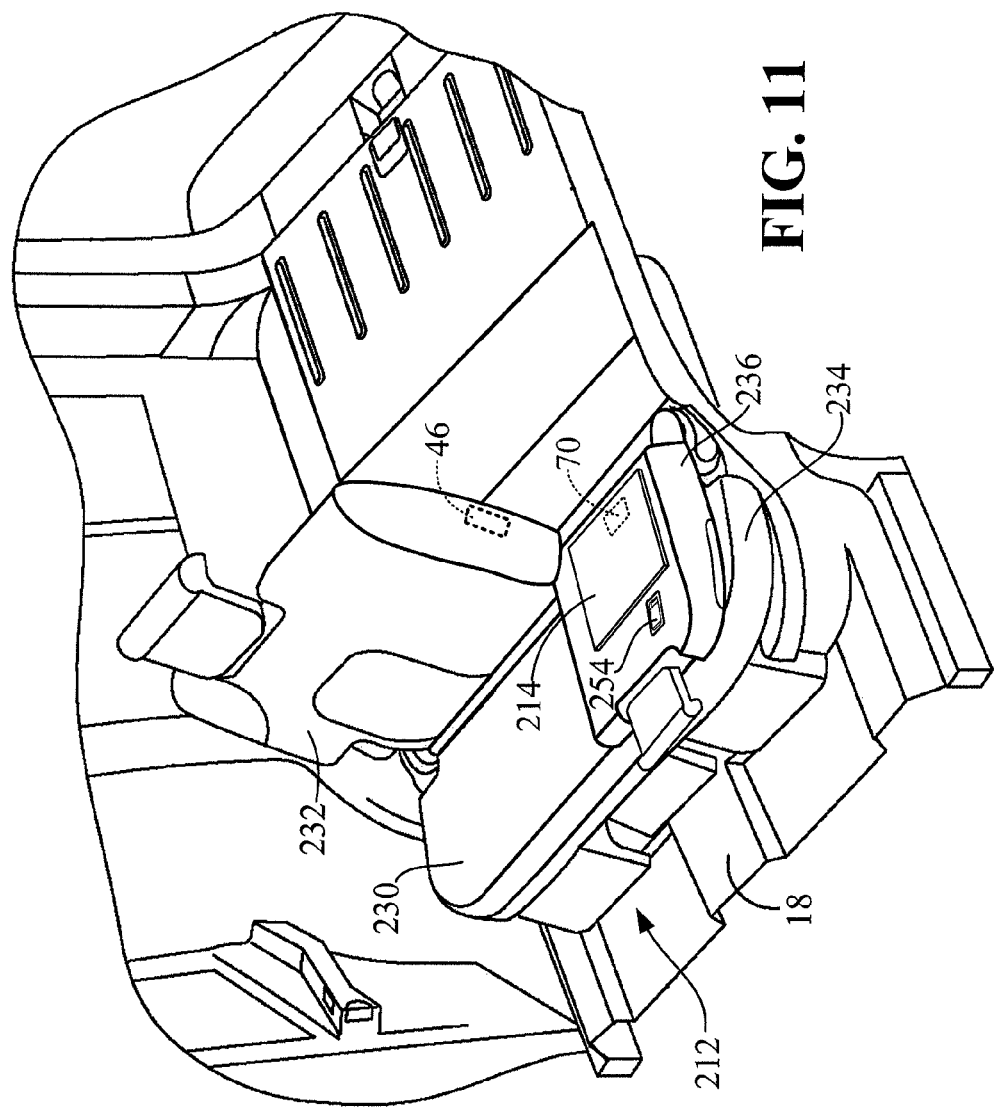
FIG. 11 is a perspective side view of the vehicle showing a second seatback portion of the seat assembly in a retracted non-use orientation and the partitioning panel in the stowed position in accordance with a third embodiment of the present invention.
Figure 12:
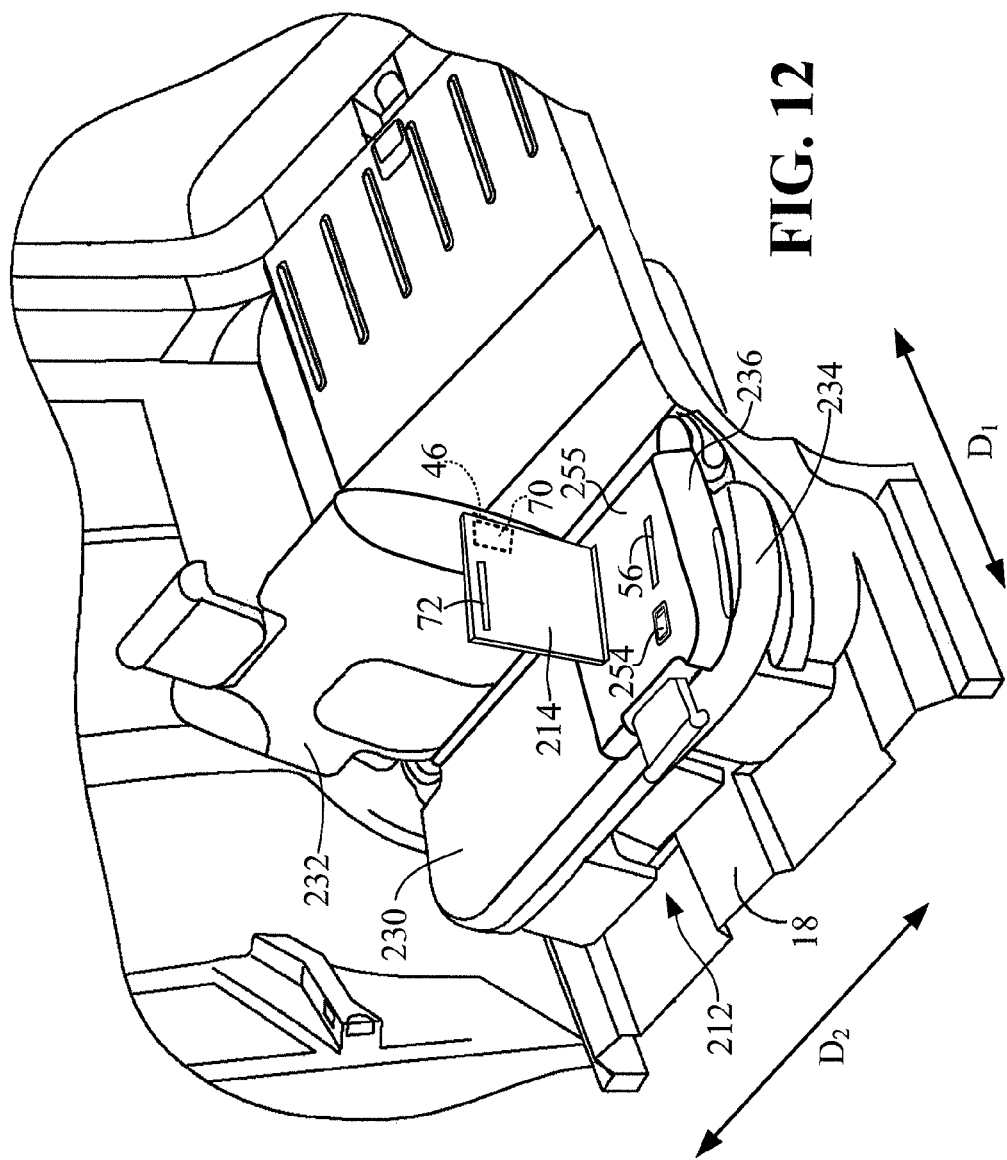
FIG. 12 is a perspective side view of the vehicle similar to FIG. 11, showing the second seatback portion of the seat assembly in the retracted non-use orientation and the partitioning panel in the partitioning position in accordance with the third embodiment of the present invention.

Referring now to FIGS. 11 and 12, a seat assembly 212 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the seat assembly 212 includes a first cushion portion 230, a first seatback portion 232, a second cushion portion 234, a second seatback portion 236 and a partitioning panel 214.

In the first embodiment, the second cushion portion 34 is wider in the lateral vehicle direction $D_2$ than the first cushion portion 30, as shown in FIGS. 3, 4 and 5. However, in the third embodiment shown in FIGS. 11 and 12, the first cushion portion 230 is wider in the lateral vehicle direction $D_2$ than the second cushion portion 234. More specifically, the first cushion portion 230 includes two seating areas (seating for two passengers) and the second cushion portion 234 includes a single seating area (seating for one passenger). The second seatback portion 236 is approximately the same width as the second cushion portion 234.

The second seatback portion 236 includes a conventional lever mechanism 254 that operates a conventional locking mechanism (not shown) that locks the second seatback portion 236 in the upwardly extending in-use orientation. Since the second seatback portion 236 is not as wide as the second seatback portion 36 of the first embodiment, consideration must be made for the overall dimensions of the partitioning panel 214. Specifically, in a stowed position, the partitioning panel 214 covers a significant portion of a back surface 255 of the second seatback portion 236. In order to leave the lever mechanism 254 exposed for operation, the partitioning panel 214 is not as tall as the partitioning panel 14 of the first embodiment. Otherwise, the partitioning panel 214 has all the features of the partitioning panel 14 of the first embodiment. For example, the partitioning panel 214 includes positioning fastening element 70 and the stowing fastening element 72. Operation of the partitioning panel 214 is the same as operation of the partitioning panel 14 of the first embodiment.

Fourth Embodiment

Figure 13:
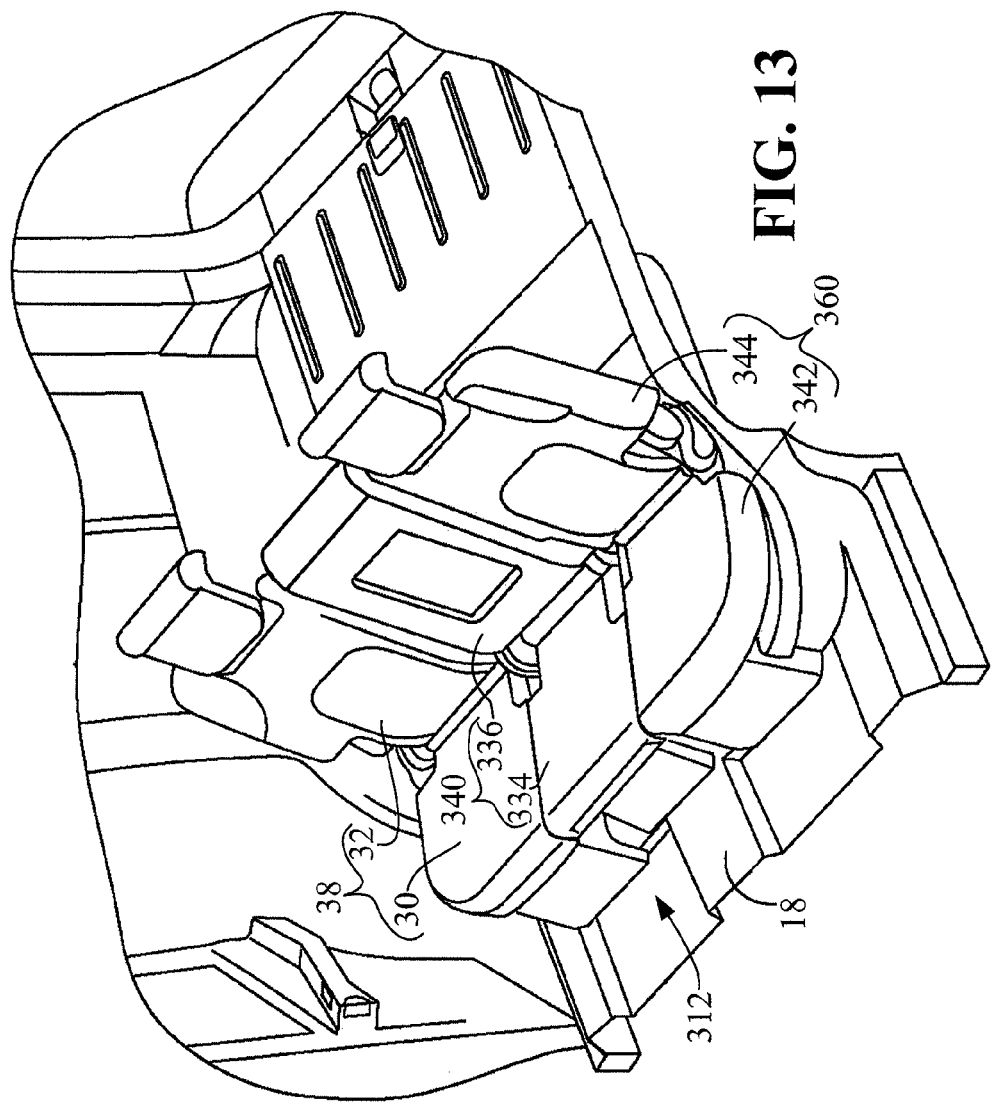
FIG. 13 is a perspective side view of the vehicle with one side of the vehicle removed, showing a seat assembly that includes first, second and third cushion portions and first, second and third seatback portions, with the first, second and third seatback portions in an upwardly extending in-use orientation in accordance with a fourth embodiment of the present invention.
Figure 14:
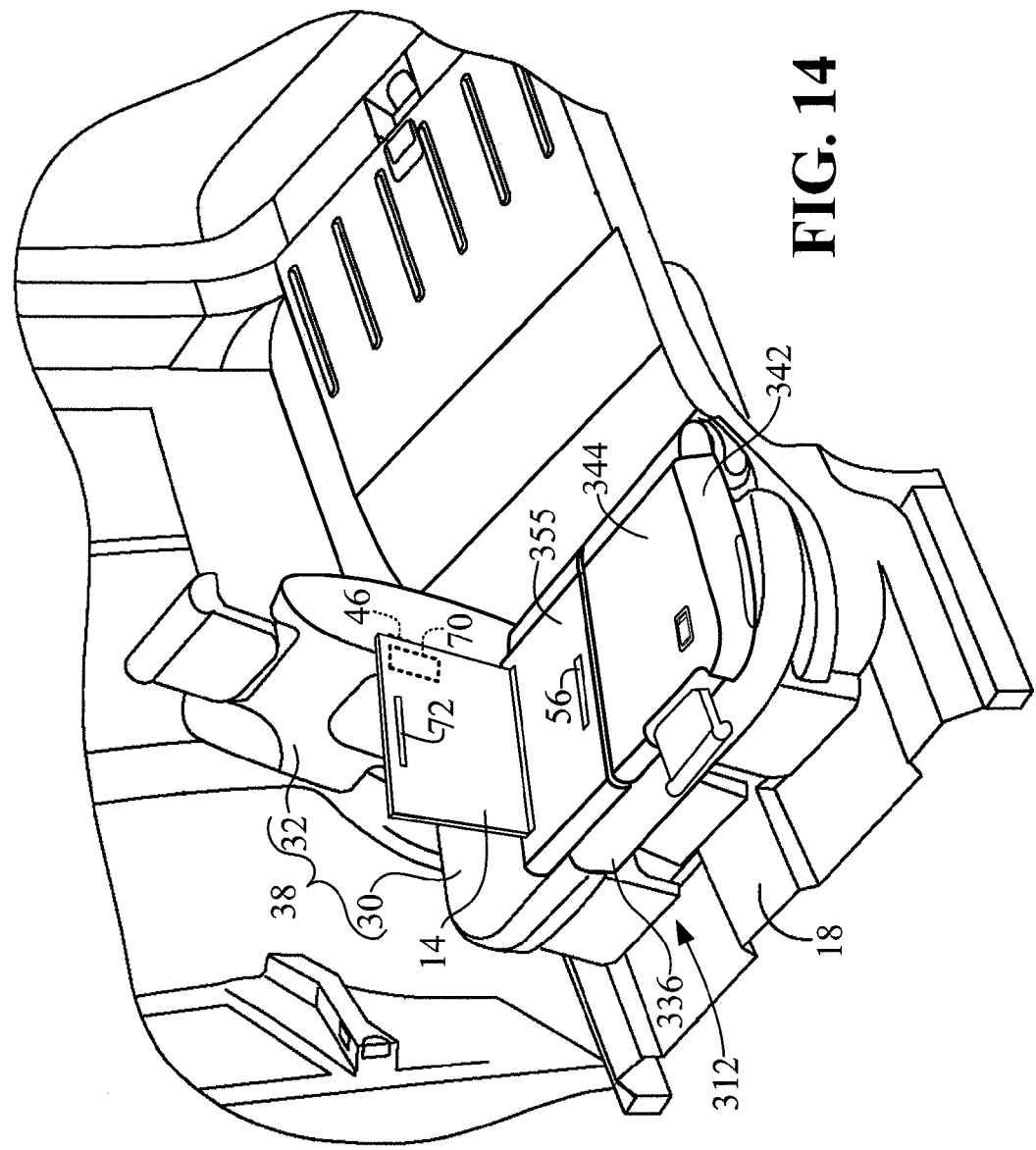
FIG. 14 is a perspective side view of the vehicle similar to FIG. 13 showing the second and third seatback portions in a retracted non-use orientation, with the partitioning panel in the partitioning position in accordance with the fourth embodiment of the present invention.

Referring now to FIGS. 13 and 14, a seat assembly 312 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The seat assembly 312 includes the first cushion portion 30 and first seatback portion 32 (the first seating section 38) of the first embodiment, but replaces the second cushion portion 34 and second seatback portion 36 with a second cushion portion 334, a second seatback portion 336, a third cushion portion 342 and a third seatback portion 344.

The second cushion portion 334 and the second seatback portion 336 define a second seat section 340 and the third cushion portion 342 and the third seatback portion 344 define a third seat section 360.

As shown in FIG. 14, the partitioning panel 14 is attached to a back surface 355 of the second seatback portion 336. Consequently, the second seatback portion 336 includes the partition retaining portion 56 for holding the partitioning panel 14 in the stowed position. Further the partitioning panel 14 includes the positioning fastening element 70 and the stowing fastening element 72.

The third cushion portion 342 and the third seatback portion 344 are conventional seating elements. As shown in FIG. 14, the second seatback portion 336 and the third seatback portion 344 can be moved independently between their respective upwardly extending in-use orientations and their respective retracted non-use orientations. Operation of the partitioning panel 14 is the same as in the first embodiment.

Fifth Embodiment

Figure 15:
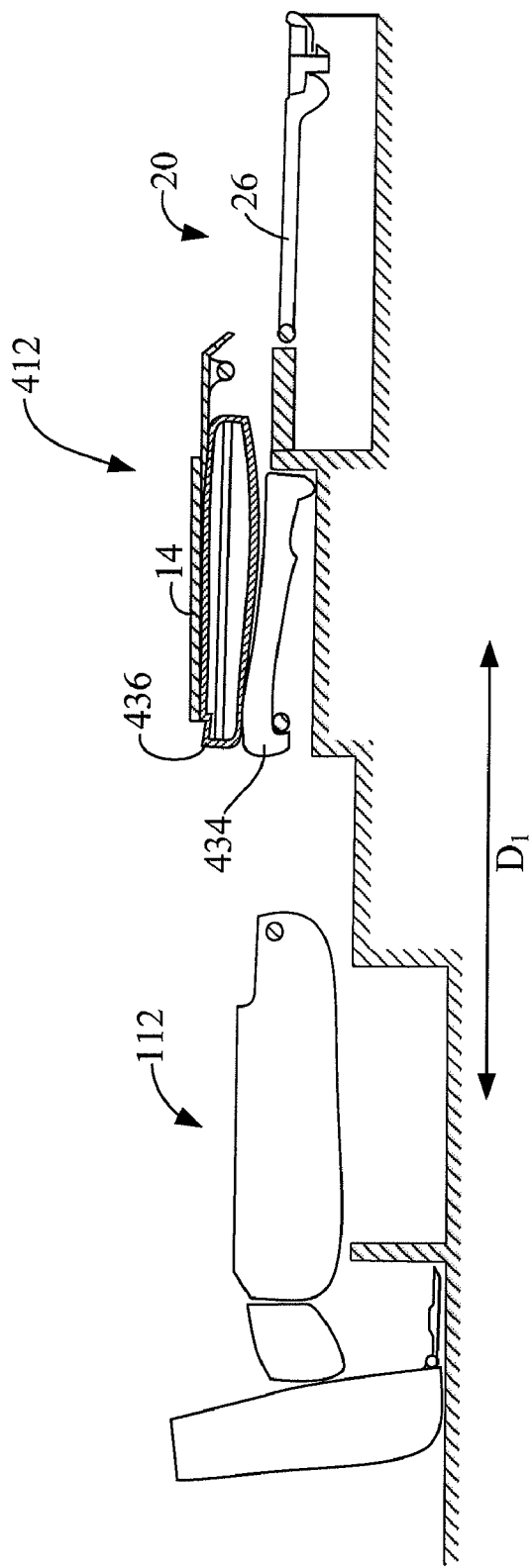
FIG. 15 is a side view of the vehicle showing a second row seat assembly and a third row seat assembly in accordance with a fifth embodiment of the present invention.
Figure 16:
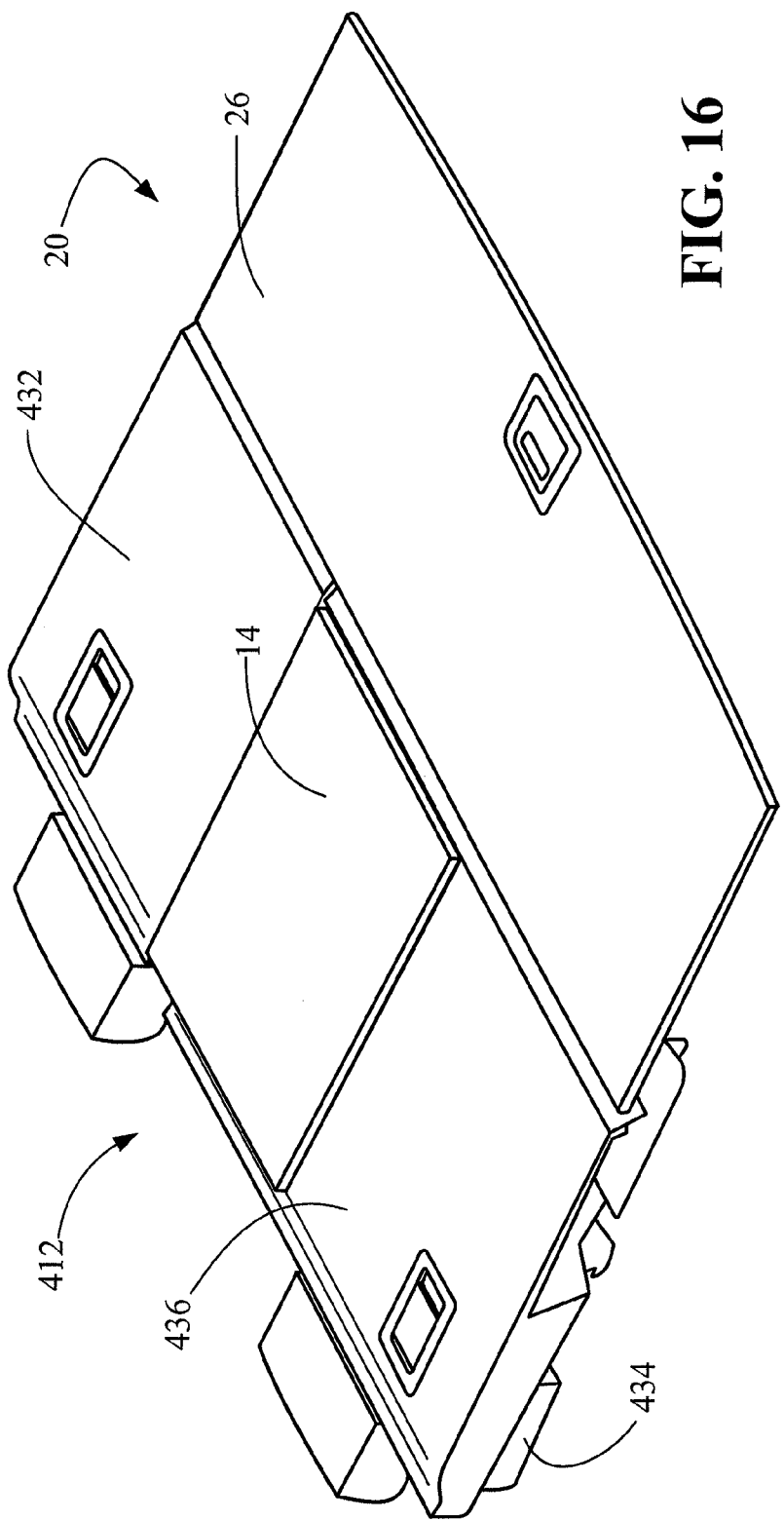
FIG. 16 is a perspective view of the third row seat assembly with first and second seatback portions in a retracted non-use orientation and the partitioning panel in the stowed position in accordance with the fifth embodiment of the present invention.
Figure 17:
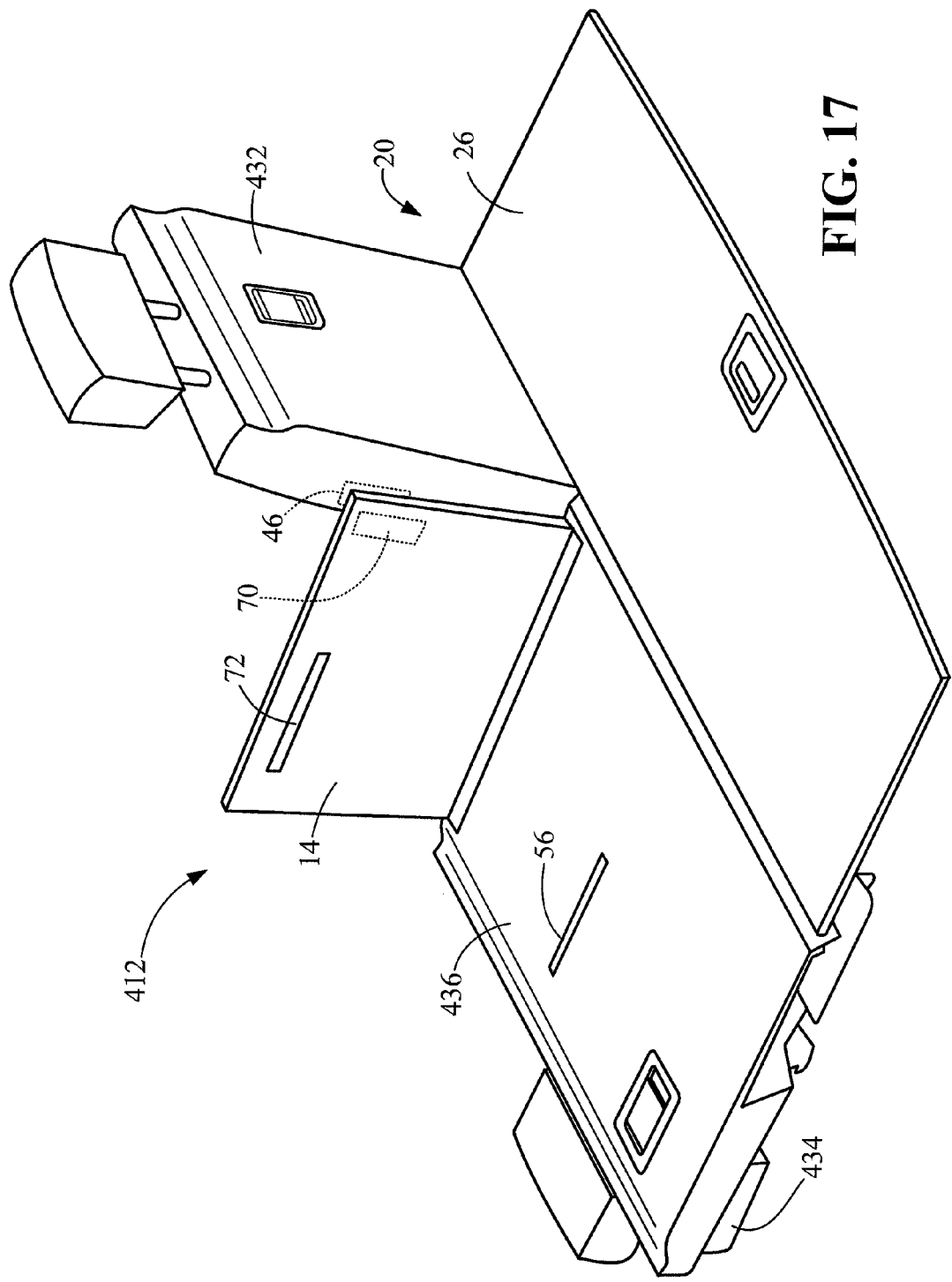
FIG. 17 is a perspective view of the third row seat assembly with the first seatback portion in an upwardly extending in-use orientation, the second seatback portion in the retracted non-use orientation and the partitioning panel in the partitioning position in accordance with the fifth embodiment of the present invention.

Referring now to FIGS. 15, 16 and 17, a seat assembly 412 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

As mentioned above, the first, second, third and fourth embodiments described above were depicted as being the second row of seats behind a front row driver's seat D (FIGS. 1 and 2) and adjacent passenger seat P (FIGS. 1 and 2). In the fifth embodiment, the seat assembly 412 comprises a third row of seats located immediately in front of or part of the cargo deck 26 of the cargo area 20 of the vehicle 10.

As further indicated in FIG. 15, the seat assembly 412 is installed behind the seat assembly 112 of the second embodiment relative to the longitudinal direction $D_1$ of the vehicle 10.

The seat assembly 412 includes a first cushion portion (not shown), a first seatback portion 432, a second cushion portion 434, a second seatback portion 436 and the partitioning panel 14. The first seatback portion 432 includes the fastening element 46 and the second seatback portion 436 includes the partition retaining portion 56. The partitioning panel 14 includes the positioning fastening element 70 and the stowing fastening element 72. Operation of the partitioning panel 14 is the same as in the first embodiment.

Sixth Embodiment

Figure 18:
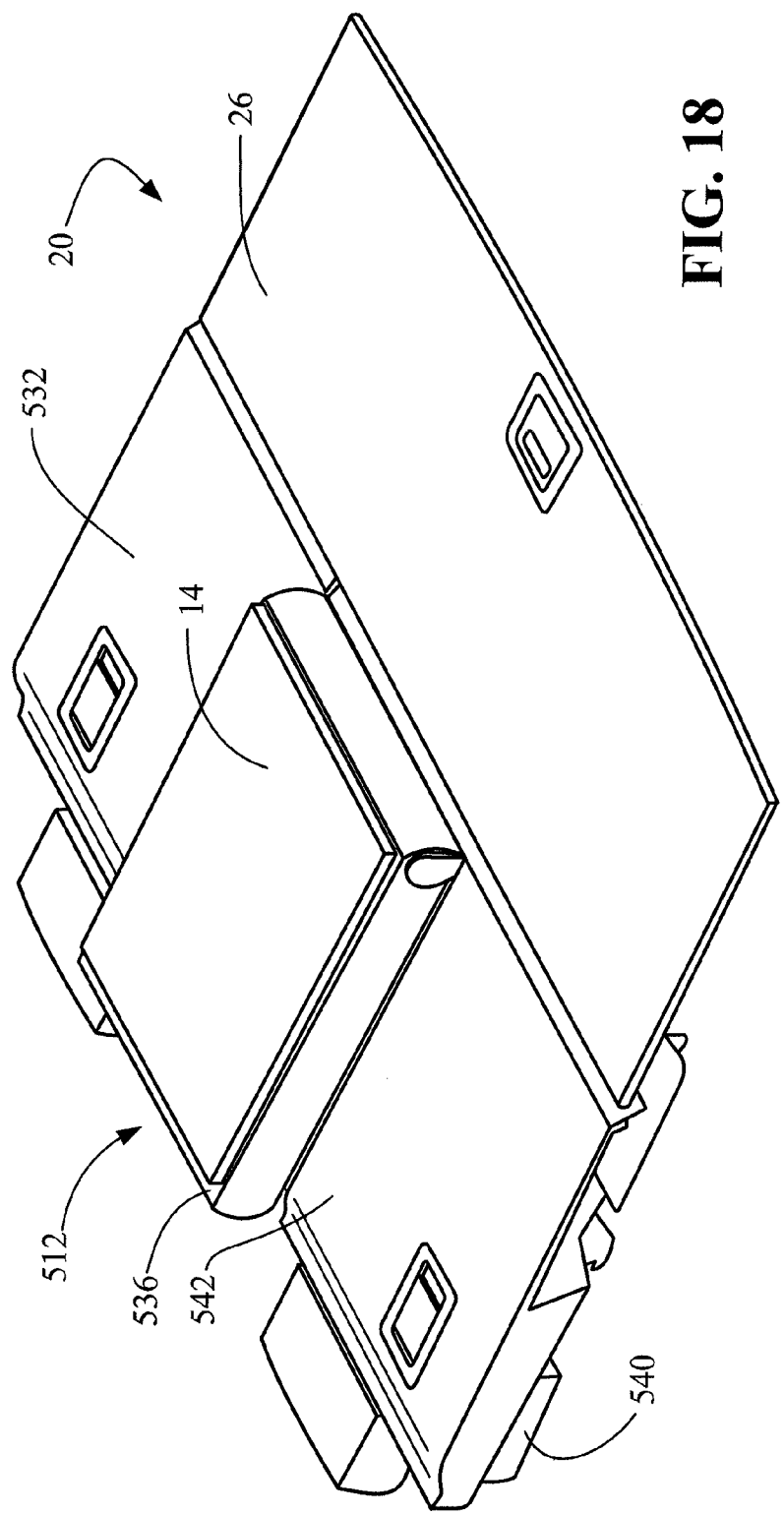
FIG. 18 is a perspective view of a third row seat assembly with first, second and third seatback portions in a retracted non-use orientation and the partitioning panel in the stowed position in accordance with the sixth embodiment of the present invention.

Referring now to FIGS. 18 and 19, a seat assembly 512 in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

The seat assembly 512 includes a first cushion portion (not shown), a first seatback portion 532, a second cushion portion (not shown), a second seatback portion 536, a third cushioning portion 540, a third seatback portion 542 and the partitioning panel 14. As indicated in FIG. 19, the first seatback portion 532 includes the fastening element 46 and the second seatback portion 536 includes the partition retaining portion 56. The partitioning panel 14 includes the positioning fastening element 70 and the stowing fastening element 72, as described above in the first embodiment. Operation of the partitioning panel 14 is the same as in the first embodiment.

As shown in FIGS. 18 and 19, the second seatback portion 536 is higher than the first and third seatback portions 532 and 542, when in the retracted non-use orientation. There are a variety of reasons for the second seatback portion 536 being vertically higher. For example, a portion of the vehicle suspension (not shown), drive shaft (not shown) and/or rear transaxle (not shown) may need space requiring a central portion of the seat assembly 512 to be raised. Regardless of the configuration of the seat assembly 512, the partitioning panel 14 operates in a manner that is identical to the first embodiment.

The portions of the vehicle 10 and structural portions of the seat assemblies 12, 112, 212, 312, 412 and 512 that enable the various seatback portions to move between the upwardly extending in-use orientation and the second seatback portion in the retracted non-use orientation are conventional components that are well known in the art. Since seatback portions of vehicles are well known in the art, these structures will not be discussed or illustrated in detail herein. Rather, it will be apparent to those skilled in the art from this disclosure that the components can be any type of structure that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle seat assembly comprising:
    a first seat section having a first seat cushion portion and a first seatback portion that define a first seating area, the first seatback portion includes a first fastening element;
    a second seat section having a second seat cushion portion and a second seatback portion that define a second seating area disposed laterally adjacent the first seating area, the second seatback portion being movably mounted between an upwardly extending in-use orientation and a retracted non-use orientation; and
    a partitioning panel includes a hinge portion fixed to a rear surface of the second seatback portion such that the partition pivots between a stowed position in which the partitioning panel is disposed parallel to the second seatback portion outside of the first and second seating areas and a partitioning position in which the partitioning panel extends upwardly along a lateral side of the first seat section in a forward to aft direction of the first seat section such that with the second seatback portion in the retracted non-use orientation and the partitioning panel in the partitioning position, the partitioning panel prevents cargo placed on a backside of the second seatback portion from moving toward the first seat section, the partitioning panel having a second fastening element with the first and second fastening elements being configured and arranged to cooperate together to selectively retain the partition in the partitioning position.

2. The vehicle seat assembly as set forth in claim 1, wherein the partitioning panel is a rigid member.

3. The vehicle seat assembly as set forth in claim 1, wherein the partitioning panel is a generally flat planar member.

4. The vehicle seat assembly as set forth in claim 1, wherein the first seat section is wider in a lateral vehicle direction than the second seat section.

5. The vehicle seat assembly as set forth in claim 1, wherein the second seat section is wider in a lateral vehicle direction than the first seat section.

6. The vehicle seat assembly as set forth in claim 1, wherein the first seatback portion is pivotally coupled to move between a generally upright orientation and a retracted orientation.

7. The vehicle seat assembly as set forth in claim 1, wherein the first seatback portion includes a partition retaining portion configured to selectively retain the partition in the partitioning position.

8. The vehicle seat assembly as set forth in claim 1, wherein one of the first and second fastening elements includes a magnet and the other of the first and second fastening elements includes a magnetically susceptible material.

9. The vehicle seat assembly as set forth in claim 1, wherein the partition is retained against a backside of the second seatback portion in the stowed position.

10. The vehicle seat assembly as set forth in claim 1, wherein the second seatback portion includes a partition retaining portion configured to retain the partition in the stowed position.

11. The vehicle seat assembly as set forth in claim 10, wherein
    the partitioning panel includes a first fastening element and the second seat section includes a second fastening element, with the first and second fastening elements being configured and arranged to cooperate together to selectively retain the partition in the stowed position.

12. The vehicle seat assembly as set forth in claim 11, wherein
    the first and second fastening elements are formed by a hook and loop fastener.

13. The vehicle seat assembly as set forth in claim 1, wherein the second seat cushion portion is pivotal between a generally horizontal seating orientation and a vertical orientation such that with the second seat cushion portion in the generally horizontal seating orientation the second seat cushion portion interferes with movement of the second seatback portion to the retracted orientation.

14. The vehicle seat assembly as set forth in claim 1, wherein the second seat cushion portion is pivotal between a generally horizontal seating orientation and a vertical orientation such that only with the second seat cushion portion in the vertical orientation the second seatback portion is freely movable to the retracted orientation.

15. The vehicle seat assembly as set forth in claim 1, further comprising:
    a third seat section having a third seat cushion portion and a third seatback portion that defines a third seating area, with the second seating area disposed between the first and third seating areas.

16. The vehicle seat assembly as set forth in claim 1, wherein:
    the second seat section includes a lever mechanism operable to control movement of the second seat section between the upwardly extending in-use orientation and the retracted non-use orientation, and the partitioning panel is dimensioned to allow access to the lever mechanism.

17. The vehicle seat assembly as set forth in claim 1, wherein:
    the first and second seat sections are disposed forward from a cargo area such that with the second seat section in the retracted non-use orientation, a back surface of the second seat section extends the cargo area.

18. The vehicle seat assembly as set forth in claim 1, wherein:
    with the second seatback portion in the retracted non-use orientation and the partitioning panel in the partitioning position, the partitioning panel extends upward from a backside of the second seatback portion.

* * * * *